Figure 1:
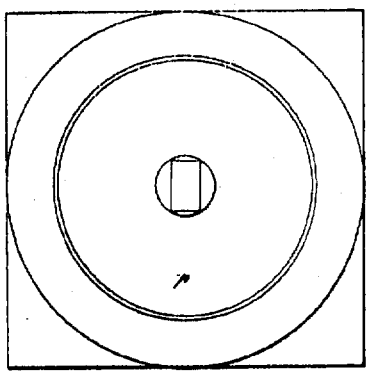
Figure 2:
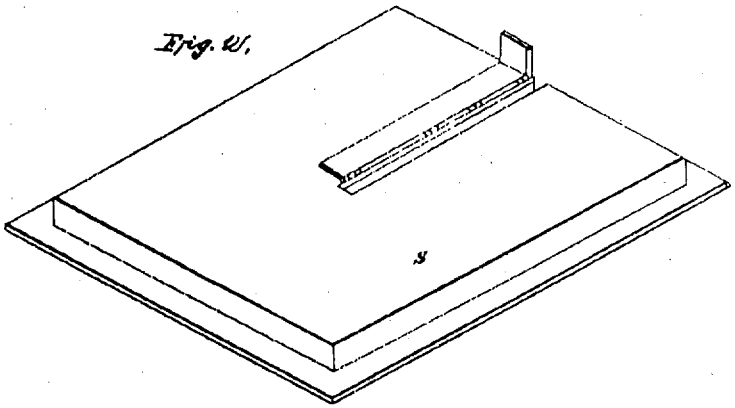

9455X
2 Sheets-Sheet 1.
D. Harrington,
Fire-Proof Safe.
Patented Mar. 2, 1836.
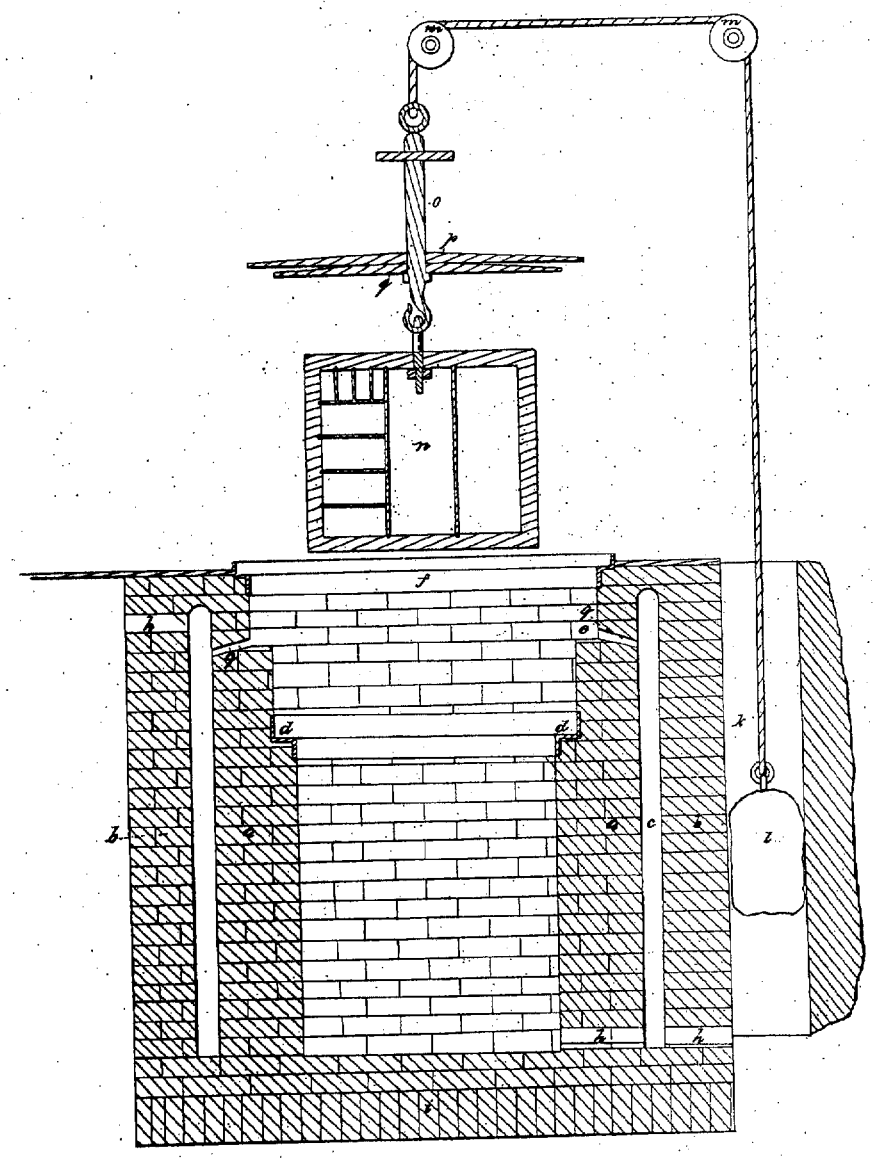
AM. PHOTO-LITHO. CO. N.Y. (OSBORNE'S PROCESS)

9455X

2 Sheets-Sheet 2

D. Harrington,

Fire-Proof Safe.

Patented Mar. 2, 1830.

Daniel Harrington (146) 9455X

The Schedule referred to in these Letters Patent and making part of the same containing a description [illegible] in the words of the said Daniel Harrington himself of his improvement in the fire proof safety vault for keeping Books papers &c.

To all whom it may concern Be it known that I Daniel Harrington of the City of Philadelphia in the State of Pennsylvania have invented a safety vault [illegible] case & other apparatus connected with the same which I denominate fire proof apparatus for the safe keeping of Books, papers, Money and other things during the conflagration of buildings &c.

The proper foundation of the vault is to be laid of brick, stone or other material and brought up even with the bottom of the cellar. Then the walls of the vault of the same materials are to be commenced of any thickness, from one to four feet that may be deemed necessary and continued upwards until even with the top of the first floor above, or a double wall may be carried up leaving an air chamber of 2, 4, or 6 inches between the inner and outer wall which two walls may be brought into one near the top leaving an outlet for the escape of warm air at their junction on one or other side and an inlet for cool air at their bottom. which inlet may be by [illegible] also through the inside wall, this inlet for air may be by means of a tube from the out side of the building or from the bottom of the cellar. The dimensions of the vault within commencing at the bottom may be one and a half by three feet which size may be continued to within two or three feet from the top. at which height a shoulder or off set of 3 inches is to be made on all sides [illegible] having [illegible] placed in even with the inner surface of the walls on which for the purpose of strength may be [illegible] under 2 or 3 inches below the offset, and for the purpose of forming a chamber all around may [illegible] 2, 4, or 6 inches above it, the walls may

Q995X may then be carried up leaving the dimensions of that part of the vault two feet by 3 feet within one foot of the top, at which [illegible] height another offset similar to the above described either with or without the iron rim may be made and the walls continued to the top at which an iron rim is to be fixed as described above, but need not rise more than 1 to 2 inches above the top, as this rim is merely to guide the top cover hereafter to be described to its place and also prevent water from running into the vault. the other rim and chamber formed by it is to stop fused metal or water from descending lower and may discharge either of them by having a small outlet in the brick work passing obliquely downward to the bottom of cellar outside of the wall or into the air chamber in case of a double wall. Between the back wall of the vault & the cellar wall running down the whole width may be made if desirable a small channel from bottom to top of any necessary dimensions in which a counter weight hereafter to be mentioned may play up and down. The case for containing books, papers or other articles may be made of wood or metal of any and dimensions that will permit it to pass loosely in the lower part of the vault and it may have small wheels attached to its sides to prevent its coming into contact with the wall when letting down or drawing up. at the centre of the upper end of the case is to be attached an iron bar by a hook or eye or some kind of hinge form or moveable attachment (or there may be two of these iron bars attached near to the side extremities or edges right & left) this bar may be 1/2 of an inch thick by 2 to 4 inches wide and of sufficient length when the top end is a little above or a little below the topmost iron offset to let the top of the case below the offset first described above, at the upper end of this bar may be two holes, one below the other, one hole to receive the rope or chain which is to pass [illegible]

ver a couple of pulley wheels to be attached to the joists of
the floor of the second story of the building, the other end of which
rope or chain is to be attached to the counter weight which
latter is to be almost (but not quite) as heavy as the bar and
apparatus suspended by it. and which apparatus will
or may) consist of two thick iron covers (of wrought or cast
iron) one to pass loosely down and rest upon the lowest
offset or rim (and) the other to rest upon the second offset. From
these two covers by means of a mortise in the centre of each
through which the iron bar is to be inserted, will be drawn
up and let down with the case, and by their sliding upon
the bar will always adjust themselves to their places whether
[illegible] in the vault or above it. a small shoulder may
be left upon the bar above its attachment to the case
or a pin or key put through it which would sustain the
weight of these two covers or they may slide quite down
upon the bar and rest upon the top of the case. The sec-
ond hole from the top of the bar may have a pin or key through
it which may be of iron, wood, horn or whalebone &
which pin will or may be made to rest across the
mortise in the middle cover and sustain the weight
of the case below & its contents. The top most cover to be
made of wrought or cast iron (and of any necessary thick-
ness) may be turned down at each of its ends say 1 to
1½ inches so as to embrace the two ends of the rim at the
top and project an inch or two past the rim at
each of its sides. This cover may run upon four small wheels
on its axles or be used without them. From the centre of this
cover to one of its side edges should be a groove or opening
wide enough to admit the pulley rope or chain when the case
is down in the vault & thereby permit this cover to be run
over the mouth of the vault as the last security to the
same. And there may be an iron cover to work by means of one or two hinges to turn over and close this groove &
exclude fire water &c from entering through it. If this
last cover should be well fastened down by cross bars of iron
it will constitute a safety vault against thieves as
well as against fire — When the case is to be drawn up, the
top cover is to be [illegible] from over the mouth of the vault and
the case and its apparatus being a trifle heavier than the
counter weight a slight exertion of strength will be required
to elevate it above the top [illegible]. When the cover is to be [illegible]
back to its place & the case suffered to stand or rest upon it
the mode of letting it down at night will suggest itself
This fire proof apparatus as above described, the inventor
believes to be safe — but for the purpose of double or additional
safety the vault may be extended as far below the bottom
of the cellar as may be desired. This part of it made of
plank tongued and grooved, or of other materials — and
at or below the bottom of the cellar a trap or falling door
may be set with hinges or other [illegible] on one side of the
wall with appropriate effects to stand or fall upon and which
door should be set leaning at its top a trifle toward the
middle so that it will fall of itself and close the vault un-
less it should be propped open which may be done by a
slender prop of wood so that the weight of the case in its
descent would readily knock it out of its way and thereby
close 2nd door after itself. in case it should be made to
pass below its usual depth upon any occasion, this door should
be always propped open when the case is above. In all cases
when this additional depth of vault is constructed, the fire
[illegible] hinge in the second [illegible] of the box near its [illegible] as
above described should be of some material that will ignite
as [illegible] wood &c. If from any cause the top cover should
become so mutilated as to permit fire to pass [illegible]
and rest upon the 2nd Cover by burning away the [illegible] or
[illegible]

fire & rope (a chain in this case should not be used) the case
and bar will instantly fall to the bottom (and) close the trap door
after it and a small spring which should be added to the
under or upper side of the lower iron cover will close the
matter by sliding over it, & thereby prevent embers &c from
falling through, the same kind of spring (may) be attached
to the middle cover if deemed necessary. If the middle
of the two covers by projecting forward when the case is
up should be in the way, about 1/3 of their front edges
may be made to turn up, by means of hinges and rest
against the bar during the day & turned down or
back when about to let the case down, there are other modes
by which this apparatus may be raised (and) lowered such
as the windlass, tackle &c. but by none so easily perhaps
as by the one above described. Both the vault and case
may be varied as to their dimensions, according to desire,
while the same principles are retained. As a combina-
tion of old and new forms or principles forming a [illegible]
the inventor believes himself to be entitled to it. To the
trap door and mode of shutting by the case itself to the
particular construction of the vault, well or chamber,
to the particular construction of the top cover (which should
be turned down at the edge opposite to the groove the
same as at the ends) to the mode of forming the lower
covers so as to slide upon the bar & be placed & replaced
simultaneously with the hoisting (and) lowering of the case
& consequent facility or saving of time & labour in the
[illegible], and the particular manner of suspending the
case so that the element of fire itself by consuming
the fire and rope causes the case to descend below its
common distance. Although in the foregoing description
I have enumerated the various parts which I believe to be
original with myself, I do not intend to claim them
individually individually but only in their general combination to
produce the result herein set forth.

Witness Daniel Harrington

W. F. Grimsell

Jas. A. Grimsell

Exd
H.G.P.

[1991 words.